(12) United States Patent
Duggana et al.

(10) Patent No.: US 9,813,492 B2
(45) Date of Patent: Nov. 7, 2017

(54) SYSTEM AND METHOD FOR AUTOMATIC MIGRATION OF POLLER PROXY SERVICES IN A SERVICE BUS ENVIRONMENT

(71) Applicant: ORACLE INTERNATIONAL CORPORATION, Redwood Shores, CA (US)

(72) Inventors: Satish Duggana, Bangalore (IN); Ashok Shukla, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 263 days.

(21) Appl. No.: 14/714,589

(22) Filed: May 18, 2015

(65) Prior Publication Data

US 2016/0344806 A1 Nov. 24, 2016

(51) Int. Cl.
| | | |
|---|---|---|
| *H04L 12/26* | (2006.01) | |
| *H04L 29/08* | (2006.01) | |
| *H04L 12/58* | (2006.01) | |
| *G06F 11/36* | (2006.01) | |
| *H04L 12/18* | (2006.01) | |
| *H04L 12/24* | (2006.01) | |

(52) U.S. Cl.
CPC ...... *H04L 67/1034* (2013.01); *G06F 11/3692* (2013.01); *H04L 12/185* (2013.01); *H04L 12/1836* (2013.01); *H04L 12/1863* (2013.01); *H04L 41/0654* (2013.01); *H04L 41/0695* (2013.01); *H04L 51/04* (2013.01); *H04L 67/2823* (2013.01)

(58) Field of Classification Search
CPC ............... H04L 12/1836; H04L 12/185; H04L 12/1863; G06F 11/368; G06F 11/3692; G06F 11/3688
See application file for complete search history.

(56) References Cited

U.S. PATENT DOCUMENTS

2002/0073354 A1* 6/2002 Schroiff .............. G06F 11/2023
714/4.11
2003/0220967 A1* 11/2003 Potter ..................... H04L 67/10
709/203
2005/0267947 A1* 12/2005 Patrick ................... H04L 67/16
709/217

* cited by examiner

*Primary Examiner* — Chirag R Patel
(74) *Attorney, Agent, or Firm* — Tucker Ellis LLP

(57) ABSTRACT

In accordance with an embodiment, described herein is a system and method for automatic migration of poller proxy services in a service bus environment. A singleton service framework component keeps a poller singleton application running on any of the managed servers in the cluster. The poller singleton application is registered with a cluster change listener, which listens for any state change in the cluster. Each poller proxy service is homogeneously deployed on each managed server in the cluster, and is associated with a poller engine configured to run on a particular managed server. When a managed server fails, the poller singleton application can migrate each poller engine configured to run on the failed managed server, to a running managed server, based on a preferred server list of the poller proxy service associated with that poller engine.

20 Claims, 6 Drawing Sheets

SYSTEM AND METHOD FOR AUTOMATIC MIGRATION OF POLLER PROXY SERVICES IN A SERVICE BUS ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to enterprises service buses, and are particularly related to a system and method for automatic migration of poller proxy services in a service bus environment.

BACKGROUND

An enterprise service bus (ESB), for example Oracle Service Bus (OSB), is a software architecture model for mediating messages among heterogeneous and disparate services that are loosely coupled and independently deployed within a network cluster. In such an architecture model, proxy services are commonly used to accept messages from client services, mediate the messages, and deliver them to target services. For example, in an ESB cluster, a proxy service is deployed homogenously across all servers in the cluster and executes on each server, so that when a server crashes, other servers in the cluster can continue to run the proxy service.

However, a poller proxy service, which is a particular type of proxy service that polls messages at a regular interval from a directory or an email inbox, is generally executed on a single managed server instance within a cluster at any given time. When that managed server crashes or otherwise stops, the poller proxy service stops functioning completely. An administrator needs to manually configure the poller proxy service to run on a different managed sever in the cluster.

SUMMARY

In accordance with an embodiment, described herein is a system and method for automatic migration of poller proxy services in a service bus environment. A singleton service framework component keeps a poller singleton application running on any of the managed servers in the cluster. The poller singleton application is registered with a cluster change listener, which listens for any state change in the cluster. Each poller proxy service is homogeneously deployed on each managed server in the cluster, and is associated with a poller engine configured to run on a particular managed server. When a managed server fails, the poller singleton application can migrate each poller engine configured to run on the failed managed server, to a running managed server, based on a preferred server list of the poller proxy service associated with that poller engine.

DETAILED DESCRIPTION

Figure 1:
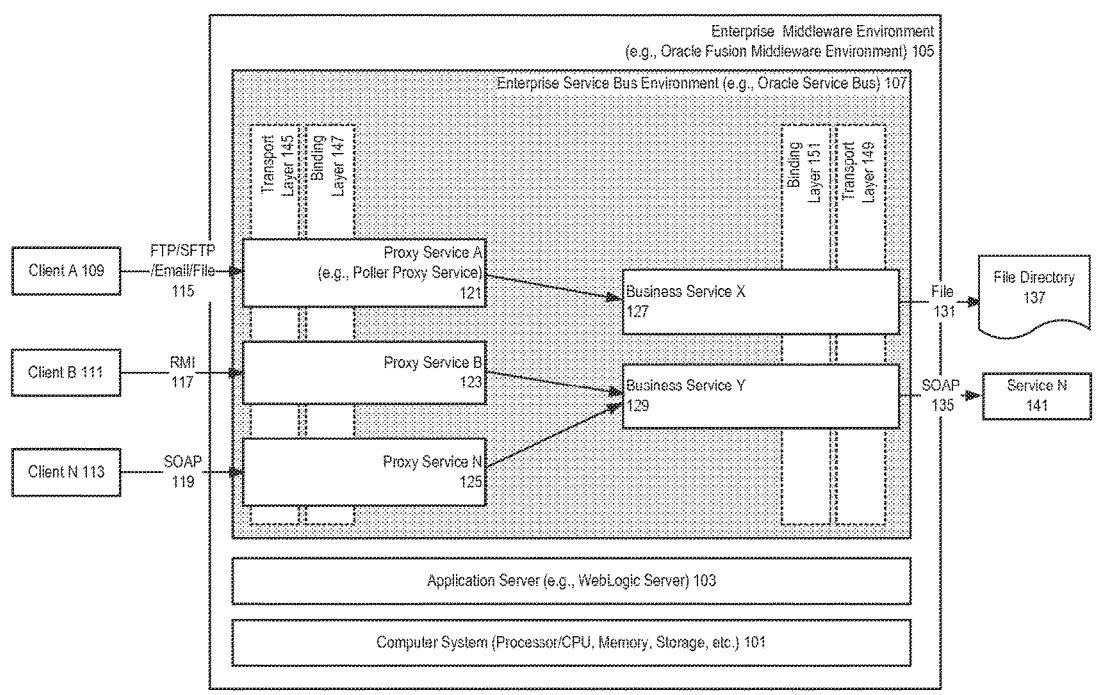
FIG. 1 illustrates a service bus environment in accordance with an embodiment.

FIG. 1 illustrates an enterprise service bus (ESB) environment in accordance with an embodiment. As shown in FIG. 1, the ESB environment (for example, Oracle Service Bus) 107 can be a software component within an enterprise middleware environment (for example, an Oracle Fusion Middleware Environment) 105 which executes on an application server (for example, WebLogic Server) 103 on a computer 101 including memory and microprocessors.

In accordance with an embodiment, the ESB environment can include one or more proxy services (for example proxy service A 121, proxy service B 123, and proxy service N 125). Each proxy service can define a service hosted locally in the ESB environment, and serve as an endpoint for incoming messages in a particular protocol from a client.

For example, proxy service A (i.e., poller proxy service) can receive messages from client A 109 in one of the FTP, SFTP, Email or File protocol 115; proxy service B can receive messages from client B 111 in RMI protocol 117; and proxy service N can receive messages from client N 113 in SOAP protocol 119.

In accordance with an embodiment, each proxy service can include pipelines that define routing, validation, and transformation logic for messages from a client; and transmit the messages to an external service (for example, a web service or JMS queue) via a business service.

As shown in FIG. 1, proxy service A can route messages received from client A to business service X 127, and proxy service B and proxy service N can route messages received respectively from client B and client N to business service Y 129.

As used herein, a business service defines an external service, including specifying an endpoint URI/location and interface of the external service. For example, business service X defines a messaging service that can write file messages to a file directory 137, and business service Y defines external service N 141.

As further shown in FIG. 1, each proxy service or business service can be associated with a transport layer, for example inbound transport layer 145 or outbound transport layer 149; and a binding layer, for example inbound binding layer 147 or outbound binding layer 151.

The inbound transport layer is a communication layer between clients and the ESB, which acts as the entry point for messages into the ESB, and supports a plurality of transport protocols, including HTTP(S), SOAP, RMI, JMS, FTP, File, and Email.

Similarly, the outbound transport layer handles communication between external services and the ESB, and supports the plurality of transport protocols as described above.

The inbound binding layer and the outbound binding layer can pack and unpack messages as necessary, and handle security for messages in message processing.

In accordance with an embodiment, the ESB can convert a message received from a client in one format to a different format. For example, the ESB can receive RMI messages from client B and SOAP messages from client N, and output 135 both types of messages in SOAP format to external service N. Similarly, the ESB can write a file message 131 to the file directory, regardless the format the message is received from client A.

By using proxy services, the transport layers and the binding layers, the ESB environment provides an architecture for mediating and messaging functionality among enterprise services that are loosely coupled, independently deployed, and heterogeneous and disparate within a network cluster.

Figure 2:
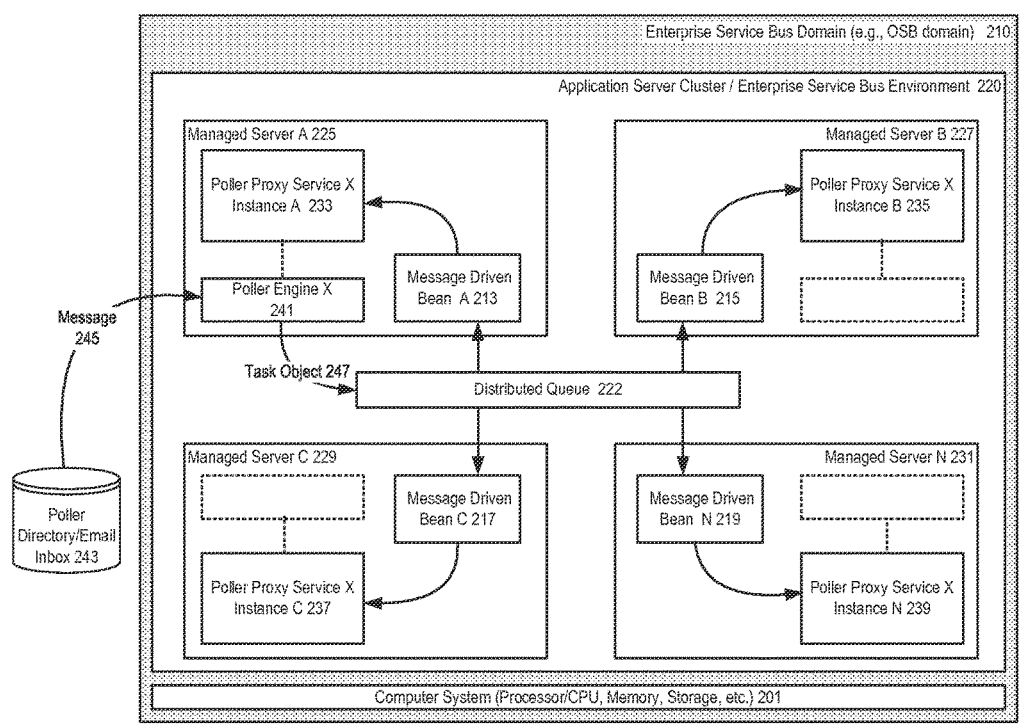
FIG. 2 illustrates an environment for poller proxy services in an ESB cluster, in accordance with an embodiment.

FIG. 2 illustrates an environment for poller proxy services in an ESB cluster, in accordance with an embodiment.

As shown in FIG. 2, an ESB domain 210 can include an application server cluster with an ESB environment 220. The application server cluster can include a plurality of managed servers, for example managed server A 225, managed server B 227, managed server C 229, and managed server N 231.

In accordance with an embodiment, the ESB domain can include a poller proxy service X homogeneously deployed on each managed server in the cluster. For example, poller proxy service X instance A 233, poller proxy service X instance B 235, poller proxy service X instance C 237, and poller proxy service X instance N 239 are respectively deployed on managed servers A, B, C and N.

However, a poller engine (for example, poller engine X 241), which polls messages 245 from a File directory, an FTP directory, an SFTP directory, or an Email inbox, is provided to only one managed server (for example, managed server A 225) in the cluster.

In accordance with an embodiment, after polling a message, the poller engine can create a task object 247, and push the task object as, for example a JMS entry, onto a distributed queue 222. Each managed server can include a message driven bean (MDB) (for example, MDBs A 213, B 215, C 217, or N 219), which listens on the distributed queue, retrieves the task object, uses the task object to obtain the message, and deliver the message to a poller proxy service instance on that managed server.

As an illustrative example, the poller proxy service X can be a FTP poller proxy service. An FTP poller engine (i.e., poller engine X) associated with the poller proxy service is deployed on managed server A, to poll an inbound directory at configured intervals. If the FTP poller engine finds a file, it renames the file to a .stage extension to ensure that it is not picked up during the next polling cycle. A JMS entry with metadata associated with the file is created and pushed onto the distributed queue, to indicate that the file is waiting to be read. MDB A on managed server A that listens on the distributed queue can retrieve the JMS entry and make a new connection to a FTP server to read the file content, and delivers the file to a request pipe-line of the FTP poller proxy service instance on managed server A.

As described above, the poller engine of the poller proxy service X executes only on one managed server in the cluster at any given time to avoid I/O issues in reading and deleting files or email messages. Whenever that managed server crashes or otherwise stops, the poller engine stops functioning completely. An administrator needs to manually configure the poller engine to run on a different managed sever.

Automatic Migration of Poller Proxy Services

In accordance with an embodiment, described herein is a system and method for automatic migration of poller proxy services in a service bus environment. A singleton service framework component keeps a poller singleton application running on any of the managed servers in the cluster. The poller singleton application is registered with a cluster change listener, which listens for any state change in the cluster. Each poller proxy service is homogeneously deployed on each managed server in the cluster, and is associated with a poller engine configured to run on a particular managed server. When a managed server fails, the poller singleton application can migrate each poller engine configured to run on the failed managed server, to a running managed server, based on a preferred server list of the poller proxy service associated with that poller engine.

Figure 3:
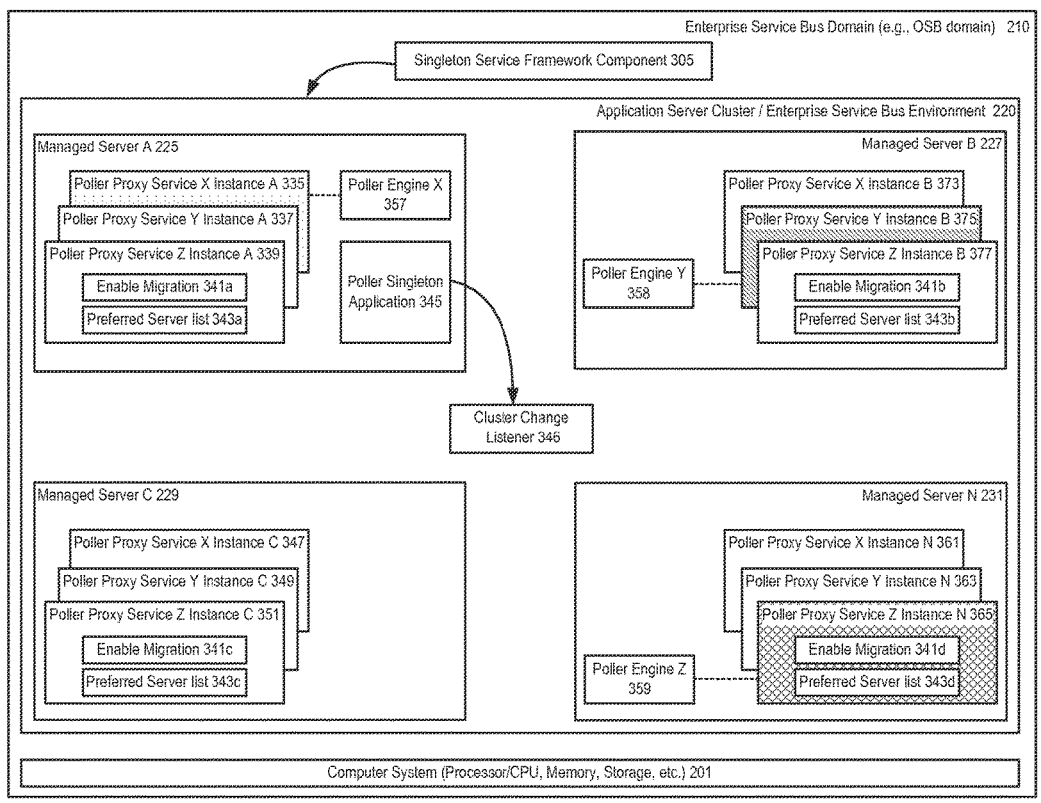
FIG. 3 illustrates a system for automatic migration of poller proxy services in an ESB cluster, in accordance with an embodiment.

FIG. 3 illustrates a system for automatic migration of poller proxy services in an ESB cluster, in accordance with an embodiment.

As show in FIG. 3, a plurality of poller proxy services (for example, poller proxy services X, Y and Z) can be deployed in the cluster. Each poller proxy service is homogenously deployed across the cluster on each managed server; and is associated with a poller engine configured to poll messages from a client that communicates with the ESB.

For example, an instance of poller proxy service X (instance A 335, instance B 373, instance C 347, or instance N 361), an instance of poller proxy service Y (instance A 337, instance B 375, instance C 349, or instance N 363), and an instance of poller proxy service Z (instance A 339, instance B 377, instance C 351, or instance N 365) are deployed on each of the managed servers.

However, in accordance with an embodiment, only one instance of each poller proxy service is configured with a poller engine to run at any given time in the cluster. The poller engine can be created and deployed to a particular managed server when that poller proxy service is deployed in the cluster. The poller engine can be a separate software application (for example, one or more Java classes) that can be accessed by the poller singleton application.

For example, poller engine X 357 associated with poller proxy service X is deployed on managed server A. Poller engine Y 358 associated with poller proxy service Y is deployed on managed server B. Poller engine Z 359 associated with poller service Z is deployed on managed server N. Although managed server C does not have any poller engine deployed thereon, the poller proxy service instances on the managed server can still receive messages for processing from the message driven bean on the managed server.

In accordance with an embodiment, each poller proxy service can be configured with an "enable migration" flag and a "preferred server list" that are shared by each instance of that poller proxy service. For example, each of the "enable migration" flags 341*a*, 341*b*, 341*c* and 341*d*, which is associated with a different proxy service instance on a different managed server, includes the same information. Similarly, each of the "preferred server lists" 343*a*, 343*b*, 343*c* and 343*d* includes the same managed servers in the cluster.

In accordance with an embodiment, the preferred server list can be arbitrarily configured by a system administrator, and stayed unchanged; or it can be dynamically updated by the poller singleton application with cluster state changes received through the cluster change listener.

In accordance with an embodiment, the preferred server list includes one or more managed servers in the cluster.

When a managed server crashes or otherwise fails, each poller engine on the failed managed server can be migrated to one of the managed servers in the list. The managed servers in the preferred server list can be ordered based on one or more of workload, service level agreement (SLA), or a user-defined preference.

When the "enable migration" flag of a poller proxy service is set to true, the poller engine for the poller proxy service can be migrated from its current hosting managed server to a managed server in the preferred server list configured for the poller proxy service. If the configuration flag is defaulted to false or unselected, the poller engine is not migrated when the current hosting managed server fails.

As further shown in FIG. 3, a poller singleton application is deployed on managed server A, and registered with a cluster change listener 346 that listens for any state change in the cluster. The poller singleton application is managed by a singleton service framework component 305, which ensures that the poller singleton application always runs on one of the running managed servers in the cluster.

In accordance with an embodiment, when the poller singleton application receives indication that one or more managed servers stop, crash or other fail, the poller singleton application can determine one or more running and one or more stopped managed servers in the cluster, determines one or more poller engines on the stopped servers, and migrate each of the poller engines on the stopped servers to a running managed server in the preferred server list of the proxy poller service associated with that poller engine.

The managed server selected as the target managed server can be determined based on the status of each managed server in the preferred server list and how these managed servers are ordered. For example, the poller singleton application can select the first running managed server, or the last running managed server, in the preferred server list as the target managed server.

Figure 4:
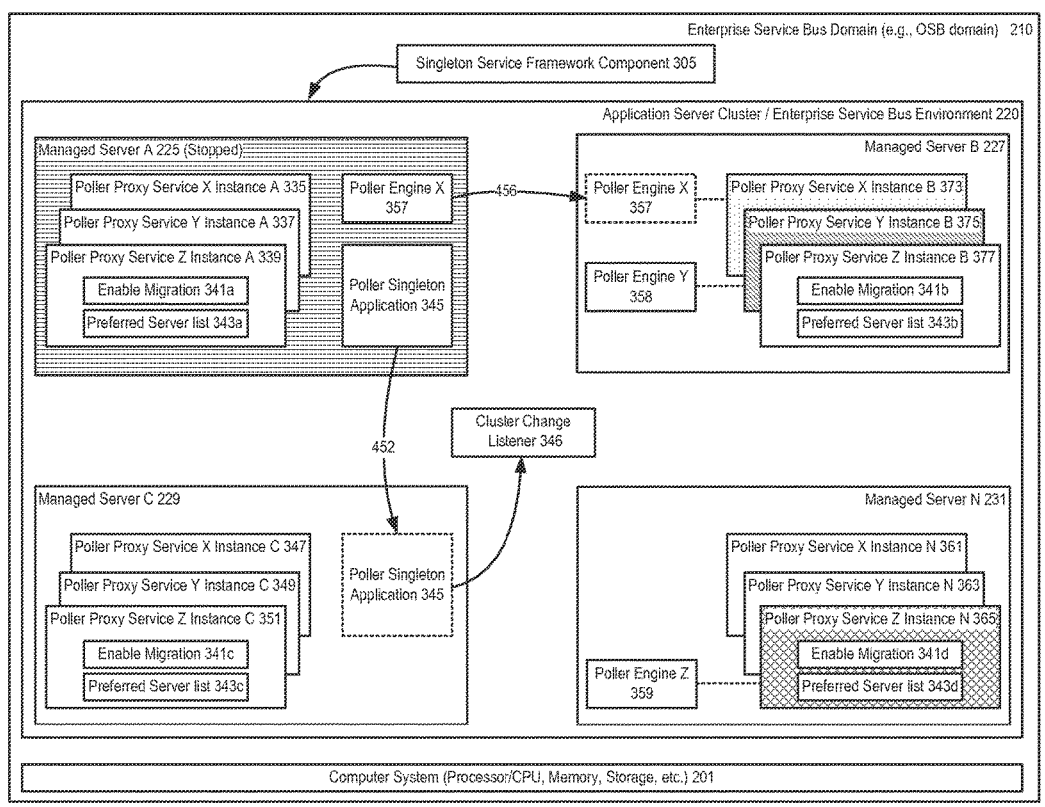
FIG. 4 further illustrates a system for automatic migration of poller proxy services in an ESB cluster, in accordance with an embodiment.

FIG. 4 further illustrates a system for automatic migration of poller proxy services in an ESB cluster, in accordance with an embodiment.

As shown in FIG. 4, when managed server A stops or otherwise fails, the singleton service framework component can migrate 452 the poller singleton application on the failed managed server A to another managed server, for example managed server C.

The singleton service framework component can use a process, for example leasing, to ensure a single owner of the poller singleton application, and failover in case of a server or cluster failure. Managed by the singleton service framework component, the poller singleton application can be running all the time, but only on one managed server at any given time.

For example, the poller singleton application can be maintained by a lease competition process supported by the singleton service framework component, wherein each managed server in the cluster continuously attempts to register the poller singleton application lease. If the managed server currently hosting the poller singleton application fails, the next managed server in a queue can take over the lease and start hosting the poller singleton application.

In accordance with embodiment, after being migrated to the new managed server, the poller singleton application can continue receiving notifications of cluster state changes from the cluster change listener. When receiving notifications that managed server A has stopped, the poller singleton application can obtain information describing all the poller proxy service instances on the stopped server. The information can include whether each poller engine on the stopped server can be migrated based on the "enable migration" flag of the poller service associated with that poller engine; and a list of preferred servers that that poller engine can be migrated to.

In accordance with an embodiment, the poller singleton application can additionally determine one or more running managed servers in the cluster, compare the running managed servers and the preferred server list of each poller proxy service, and migrate each poller engine configured to run on the failed managed server to one of the running managed servers based on the comparison.

As shown in FIG. 4, poller engine X is the only poller engine configured to run on managed server A, and can be migrated 456 to managed server B, where the poller engine can poll messages from a directory or an email inbox to trigger the execution of an instance of poller proxy service X deployed the managed server.

Figure 5:
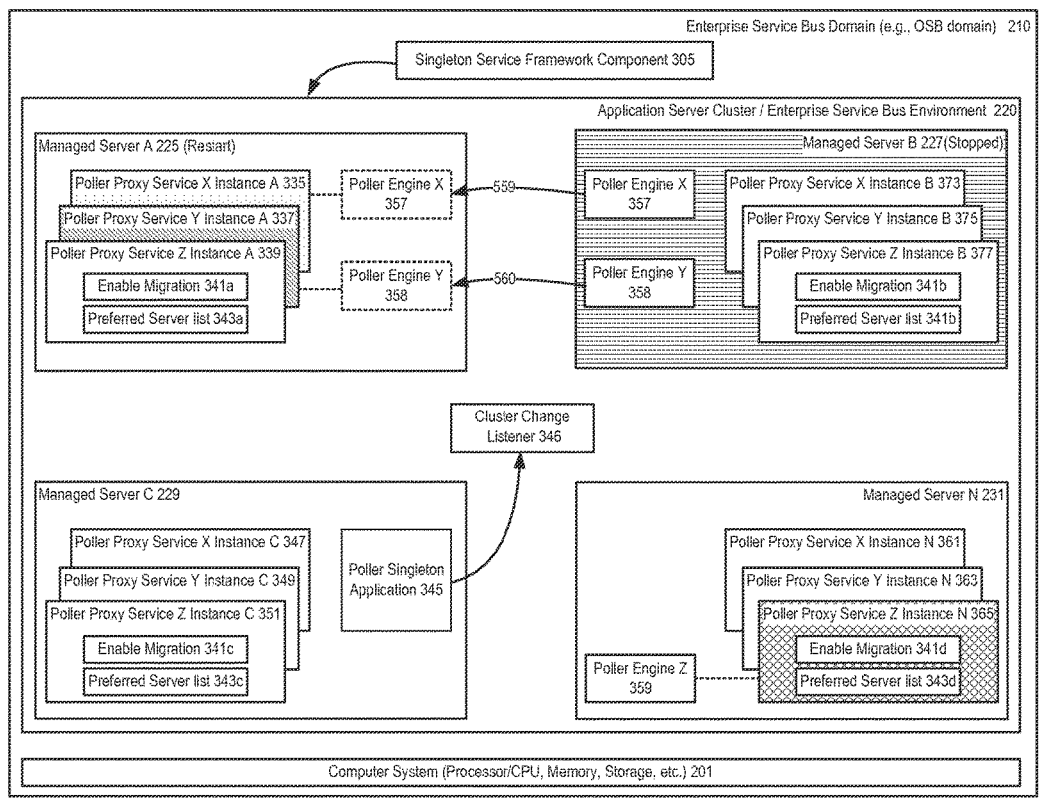
FIG. 5 further illustrates a system for automatic migration of poller proxy services within an ESB cluster, in accordance with an embodiment.

FIG. 5 further illustrates a system for automatic migration of poller proxy services within an ESB cluster, in accordance with an embodiment.

As shown in FIG. 5, the stopped managed server A has been restarted and is up and running, while managed server B stops or otherwise fails.

In accordance with an embodiment, when receiving notifications that managed server B has stopped, the poller singleton application can obtain information for poller engine X and poller engine Y that are configured to run on the managed server, and information for one or more running managed servers in the cluster; and can operate to migrate each poller engine to a running managed server based on the preferred server list of the poller proxy service associated with that poller engine. For example, the poller engines X and Y are both migrated 559, 560 to managed server A.

Figure 6:
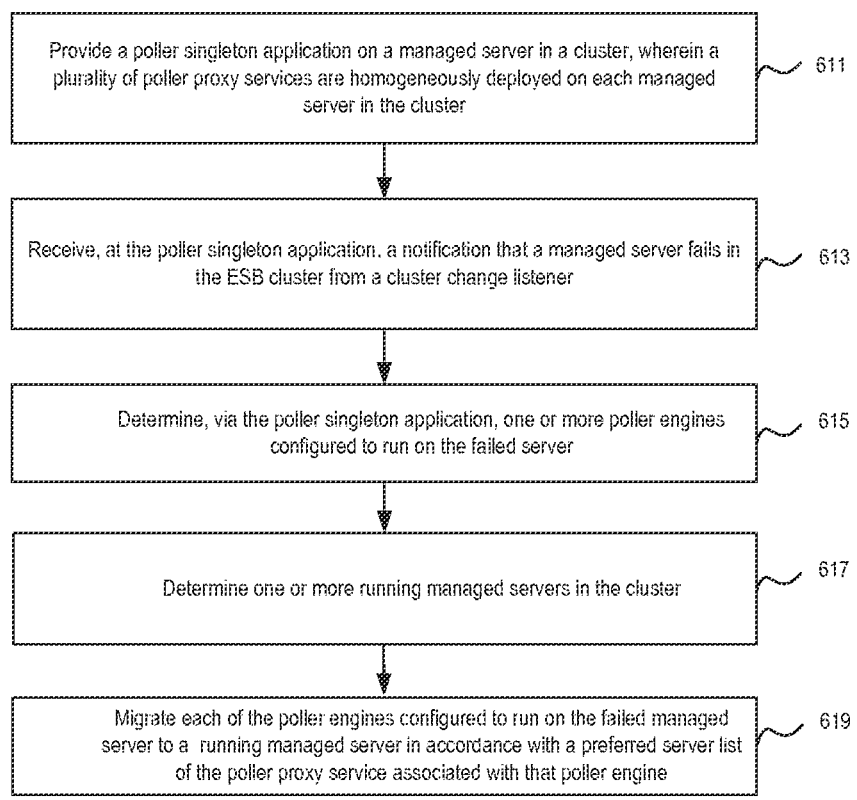
FIG. 6 illustrates a method for automatic migration of poller proxy services in an ESB cluster, in accordance with an embodiment.

FIG. 6 illustrates a method for automatic migration of poller proxy services in an ESB cluster, in accordance with an embodiment.

As shown in FIG. 6, at step 611, a domain-wide poller singleton application can be configured to run on a managed server in an ESB cluster, in which a plurality of poller proxy services are homogeneously deployed on each managed server.

At step 613, the poller singleton application detects that a managed server crashes, or otherwise stops through a cluster change listener registered with the poller singleton application.

At step 615, the poller singleton application determines one or more poller engines configured to run on the failed managed server.

At step 617, the poller singleton application determines one or more running managed servers in the cluster.

At step 619, the poller singleton application migrates each of the poller engines configured to run on the failed managed server to a running managed server in accordance with a preferred server list of the poller proxy service associated with that poller engine.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for automatic migration of poller proxy services in an application server cluster, comprising:
   one or more computers, each including a microprocessor;
   an enterprise service bus (ESB) cluster, executing on the one or more computers, wherein the ESB cluster includes
      a plurality of managed servers, and
      a poller proxy service,
         wherein an instance of the poller proxy service is deployed on each of the plurality of managed servers, and
         wherein a single one of the plurality of managed servers includes a poller engine configured to execute the instance of the poller proxy service on the single managed server;
   a poller singleton application and a cluster change listener registered therewith, wherein the cluster change listener listens for one or more state changes in the ESB cluster;
   wherein the poller singleton application operates to
      receive a notification that the single managed server including the poller engine fails,
      determine one or more running managed servers in the ESB cluster, and
      migrate the poller engine from the single managed server that has failed to one of the one or more running managed servers;
      wherein the migrated poller engine continues to execute the instance of the poller proxy service on the running managed server.

2. The system of claim 1, wherein the poller engine is a separate application that polls messages from a directory or an email inbox.

3. The system of claim 1, wherein the poller proxy service is associated with a flag that determines whether the associated poller engine is to be migrated when the single managed server including the poller engine stops.

4. The system of claim 2, wherein the poller engine creates a task object for each polled message, and pushes the task object to a distributed queue for processing.

5. The system of claim 1, wherein the poller singleton application is managed by a singleton service framework that ensures that the poller singleton application runs on a running managed server in the cluster.

6. The system of claim 1, wherein the poller singleton application is a domain-wide application.

7. The system of claim 1, wherein the poller proxy service is associated with a preferred server list that defines one or more managed servers in the cluster that the poller engine associated with the proxy service is to be migrated to when the current hosting server fails.

8. A method for automatic migration of poller proxy services in an application server cluster executing on one or more microprocessors, the method comprising:
   configuring an enterprise service bus (ESB) cluster, wherein the ESB cluster includes a plurality of managed servers, a poller proxy service, wherein an instance of the poller proxy service is deployed on each of the plurality of managed servers, and wherein a single one of the plurality of managed servers includes a poller engine configured to execute the instance of the poller proxy service on the single managed server;
   configuring a poller singleton application on the ESB cluster and a cluster change listener registered with the poller singleton application, wherein the cluster change listener listens for one or more state changes in the ESB cluster;
   receiving, at the poller singleton application, a notification that the single managed server including the poller engine fails in the ESB cluster;
   determining one or more running managed servers in the ESB cluster; and
   migrating the poller engine from the single managed server that has failed to one of the one or more running managed servers;
   wherein the migrated poller engine continues to execute the instance of the poller proxy service on the running managed server.

9. The method of claim 8, wherein the poller engine is a separate application that polls messages from a directory or an email inbox.

10. The method of claim 8, wherein the poller proxy service is associated with a flag that determines whether the associated poller engine is to be migrated when the single managed server including the poller engine stops.

11. The method of claim 9, wherein the poller engine creates a task object for each poller message, and pushes the tasks object to a distributed queue for processing.

12. The method of claim 8, wherein the poller singleton application is managed by a singleton service framework that ensures that the poller singleton application runs on a running managed server in the cluster.

13. The method of claim 8, wherein the poller singleton application is a domain-wide application.

14. The method of claim 8, wherein the poller proxy service is associated with a preferred server list that defines one or more managed servers in the cluster that the poller engine associated with the proxy service is to be migrated to when the current hosting server fails.

15. A non-transitory machine readable storage medium having instructions stored thereon which, when read and executed by a computer, cause the computer to perform a method for automatic migration of poller proxy services in an application server cluster, comprising:
   configuring an enterprise service bus (ESB) cluster, wherein the ESB cluster includes a plurality of managed servers, a poller proxy service, wherein an instance of the poller proxy service is deployed on each of the plurality of managed servers, and wherein a single one of the plurality of managed servers includes a poller engine configured to execute the instance of the poller proxy service on the single managed server;

configuring a poller singleton application on the ESB cluster and a cluster change listener registered with the poller singleton application, wherein the cluster change listener listens for one or more state changes in the ESB cluster;

receiving, at the poller singleton application, a notification that the single managed server including the poller engine fails in the ESB cluster;

determining one or more running managed servers in the ESB cluster; and migrating the poller engine from the single managed server that has failed to one of the one or more running managed servers;

wherein the migrated poller engine continues to execute the instance of the poller proxy service on the running managed server.

16. The non-transitory machine readable storage medium claim of 15, wherein each the poller engine is a separate application that polls messages from a directory or an email inbox.

17. The non-transitory machine readable storage medium claim of 15, wherein each the poller proxy service is associated with a flag that determines whether the associated poller engine of that poller proxy service is to be migrated when the single managed server including hosting the poller engine stops.

18. The non-transitory machine readable storage medium claim of 16, wherein the poller engine creates a task object for each polled message, and pushes the task object to a distributed queue for processing.

19. The non-transitory machine readable storage medium claim of 17, wherein the poller singleton application is managed by a singleton service framework that ensures that the poller singleton application runs on a running managed server in the cluster.

20. The non-transitory machine readable storage medium claim of 17, wherein the poller singleton application is a domain-wide application.

* * * * *

UNITED STATES PATENT AND TRADEMARK OFFICE
CERTIFICATE OF CORRECTION

PATENT NO. : 9,813,492 B2  
APPLICATION NO. : 14/714589  
DATED : November 7, 2017  
INVENTOR(S) : Duggana et al.

Page 1 of 1

It is certified that error appears in the above-identified patent and that said Letters Patent is hereby corrected as shown below:

In the Claims

Column 9, Line 18, in Claim 16, delete "claim of" and insert -- of claim --, therefor.

Column 9, Line 18, in Claim 16, after "wherein" delete "each".

Column 10, Line 2, in Claim 17, delete "claim of" and insert -- of claim --, therefor.

Column 10, Line 2, in Claim 17, after "wherein" delete "each".

Column 10, Line 4, in Claim 17, after "engine" delete "of that poller proxy service".

Column 10, Line 5, in Claim 17, after "including" delete "hosting".

Column 10, Line 8, in Claim 18, delete "claim of" and insert -- of claim --, therefor.

Column 10, Line 8, in Claim 18, delete "16" and insert -- 17 --, therefor.

Column 10, Line 12, in Claim 19, delete "17" and insert -- 15 --, therefor.

Column 10, Line 17, in Claim 20, delete "17" and insert -- 15 --, therefor.

Signed and Sealed this  
Second Day of July, 2019

Andrei Iancu  
*Director of the United States Patent and Trademark Office*